United States Patent [19]

Benoit et al.

[11] 4,035,293

[45] July 12, 1977

[54] PROCESS FOR TREATING AN ACIDIC WASTE WATER STREAM

[75] Inventors: Antoine Benoit, Sint Martens Latem; Sylvain A. R. Dewaele, Evergem; André Verhelst, Lokeren, all of Belgium

[73] Assignee: s.a. Texaco Belgium n.v., Brussels, Belgium

[21] Appl. No.: 596,708

[22] Filed: July 17, 1975

[51] Int. Cl.² .......................................... C02B 1/20
[52] U.S. Cl. .................................. 210/45; 210/53; 210/56; 210/67
[58] Field of Search ................. 210/10, 12, 18, 42, 210/45, 47, 51–53, 56, 66, 67

[56] References Cited
U.S. PATENT DOCUMENTS

| 3,099,622 | 7/1963 | Woerther | 210/49 |
| 3,345,288 | 10/1967 | Sontheimer | 210/53 |
| 3,623,975 | 11/1971 | Cardinal et al. | 210/67 |
| 3,650,686 | 3/1972 | Hudson et al. | 210/42 |
| 3,697,233 | 10/1972 | Peck | 210/42 |
| 3,725,265 | 4/1973 | Legal | 210/53 |
| 3,763,041 | 10/1973 | Cook et al. | 210/42 |
| 3,796,790 | 3/1974 | Sirianni et al. | 210/52 |

Primary Examiner—Thomas G. Wyse
Assistant Examiner—Peter A. Hruskoci
Attorney, Agent, or Firm—Thomas H. Whaley; Carl G. Ries; Henry W. Archer

[57] ABSTRACT

Disclosed is a process for purifying an effluent containing acids such as phosphonic and phosphoric acids by the addition of CaO or Ca(OH)$_2$ in an amount ranging from 55–93 per cent by weight basis acids at a temperature of 35° to 100° C to a pH of 8 to 12. After removing the precipitated material, the effluent can be neutralized with CO$_2$ gas. The precipitate can be calcined to tri calcium phosphate.

5 Claims, 1 Drawing Figure

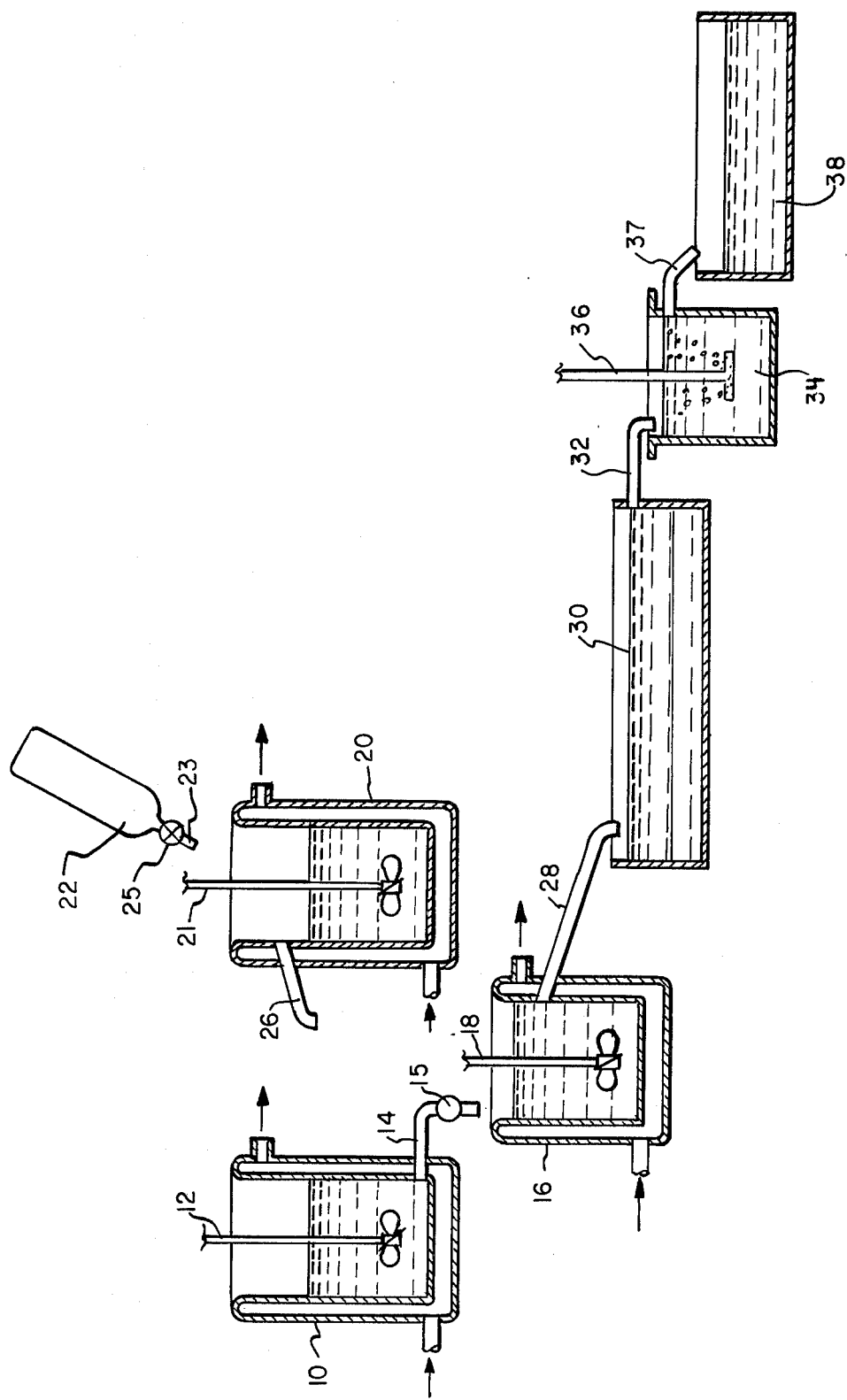

PROCESS FOR TREATING AN ACIDIC WASTE WATER STREAM

BACKGROUND OF THE INVENTION

1. Field of the Invention

The present invention relates to a process for converting highly acidic waste water streams to a reusable clarified water effluent and an easily removable precipitate. More particularly the invention is directed to the treatment of phosphonic acid/phosphoric acid emulsions in water which results from methanol distillations.

2. Statement of the Prior Art

The art to which this invention relates is aware, inter alia, of the following U.S. Pat. Nos. 3,461,067; 3,480,144; 3,855,125; 3,423,309; and 3,694,356. The first of these describes a process for treating a sewage plant effluent by contacting same with metallic iron to convert organic substances and phosphate ions therein into water soluble iron salts and removing such salts from the purification system thereby obtaining decolorized water which is readily softened for industrial reuse. In U.S. Pat. No. 3,480,144, phosphates are removed from sewage streams treated by activated sludge by introducing aluminum or ferric ions into the aerating zone of the process. In U.S. Pat. No. 3,855,125, acids in industrial wastes are neutralized and removed by adding a core of lime having a shell of cracked calcium salt. In U.S. Pat. No. 3,423,309 is disclosed a process for removing phosphates from organic wastes by a combination of lime dosage, biological removal and metal salt dosing together with recirculation of precipitated chemical-containing sludges. In U.S. Pat. No. 3,694,356 is described a process for the purification of effluent from sewage treatment combined with the simultaneous purification of acidic mine drainage by combining the two streams in such proportions as to precipitate iron phosphates.

In coassigned U.S. patent application Ser. No. 532,337 filed Dec. 13, 1974 now abandoned, is described a method for chemically treating highly acid aqueous waste prior to biological treatment thereof to precipitate compounds which inhibit the subsequent biological degradation of the wastes. The method involves adding to the wastes an alkaline earth metal ion, or neutralizing with base followed by the addition of an alkaline earth metal ion. The preferred additive is calcium ion.

BRIEF DESCRIPTION OF THE DRAWING

The accompanying drawing shows diagrammatically one installation for carrying out the present process in a continuous manner.

In the process of manufacturing a widely used lubricant additive mono (beta-hydroxyethyl) alkene thiophosphonate and following the methanol extraction of the polyolefin — $P_2S_5$ reaction product (in pale oil) prior to feeding it to the ethoxylation unit, methanol is stripped from the extract leaving a two-phase residue in the bottom of the tower (MTB). This residue consists of a highly acidic aqueous phase (pH1.2-3) containing phosphonic acids of the general formula $C_nH_{2n+1}PO_3H_2$ where $n = 12$ to 24, admixed with phosphoric acid ($H_3PO_4$) in a ratio from 0/100 up to 75/25.

In accordance with the present invention such acids can be precipitated by reacting the MTB either batchwise or in a continuously flowing system with CaO or with $Ca(OH)_2$. The phosphonic and phosphoric acids may contain some sulfur.

For the batchwise mode of operation, the amount of CaO used in this reaction ranges between 55 to 70 weight percent (70 to 93 weight percent when $Ca(OH)_2$ is used) of the amount of phosphonic and phosphoric acids present in the MTB stream. The reaction is carried out at temperatures ranging from 35° to 100° C. In this way a clear aqueous phase of pH 5.5 to 12 is obtained together with an easily precipitating solid. The aqueous phase contains an average of approximately 0.1 g phosphorus, 0.2 g calcium and 0.03 g sulfur per liter.

The above mentioned MTB stream also can be treated with CaO or $Ca(OH)_2$ in a continuously flowing system. In this system, the MTB and a CaO or $Ca(OH)_2$ slurry in water are mixed in a well stirred reactor held at a temperature of 80°-100° C, at such a rate that the residence time in the reactor is between 1 and 30 minutes. The ratio MTB over CaO or $Ca(OH)_2$ is controlled so that a pH of 8 to 12 is maintained in the reactor. In this way, a solid is formed which precipitates within 1 to 10 minutes from a slightly hazy aqueous phase which requires from 1 to 5 hours to become clear by the precipitation of some finely divided solids during flow.

In the continuous process embodiment of the invention, the addition of small amount of CaO or $Fe^{3+}$ salts to MTB prior to the introduction of this material to the reactor increases the yield of clear water obtained as described above.

The aqueous phase of both the above batchwise and continuous treatments of MTB with CaO or $Ca(OH)_2$ can be neutralized by blowing with $CO_2$ gas, provided the pH of the aqueous phase is above pH7. The precipitate obtained during the above described methods can be calcined to calcium triphosphate by heating it to 850°-900° C in a slow air stream.

In the continuous process embodiment of the present invention illustrated in the FIGURE the waste stream (MTB) is introduced into vessel 10 which is equipped with agitator 12 and heated by hot oil circulating from bottom to top of the vessel. The waste stream then is flowed through the outlet 14 of vessel 10 which has a valve 15 and into reactor 16 which is also provided with an agitator 18. Reactor 16 is also oil heated. A lime slurry is prepared in oil heated vessel 20 which is supplied by valve 25 with water from a source 22 through an outlet 23 controlled by valve 25. Vessel 20 has an agitator 21 and an outlet 26 for flowing the lime slurry into the reactor 16. Reactor 16 has an outlet 28 for flowing effluent therein into settling pond 30 where it remains under quiescent flow conditions. Settling pond 30 has an outlet 32 for flowing the overflow supernatant liquid into vessel 34 which has a sparger 36 for bubbling in $CO_2$ to neutralize this effluent and precipitate carbonate salts. The vessel has a weir 37 for flowing the clarified supernatant liquid into receiving vessel 38. Vessel 30 can be provided with an outlet at the bottom for continuously removing the precipitate therefrom to calcine it to calcium thiophosphate.

The invention is further illustrated in non limiting fashion by the following working examples.

WORKING EXAMPLE 1

One liter of MTB containing 70 g of acidic materials, is heated to 100° C with efficient stirring. To this is added at once a slurry of 51 g $Ca(OH)_2$ in 500 ml water. The mixture is stirred for 15 minutes at the same temperature. A white precipitate containing some brown particles is formed. At the end of the reaction period stirring and heating are discontinued and the precipitate is allowed to settle. When the aqueous phase is clear its pH is measured and it is decanted from the solid. $CO_2$ gas is bubbled through the aqueous phase at a rate of 100 ml gas per minute until the pH has dropped to 7. The aqueous phase obtained in this way is clear and nearly colorless.

Settling time: 1.5 hours
pH of aqueous phase after settling: 10.4
Volume of precipitate after settling: 380 ml
Volume of $CO_2$ necessary to obtain pH 7 : 15.2 l
Weight of solids dissolved in aqueous phase after $CO_2$ neutralization: 0.75 g per liter.

WORKING EXAMPLE 2

The procedure is identical to Example 1 using MTB containing 51 g of acidic materials and adding 29.3 g CaO as a slurry.

Settling time: 4.5 hours
pH of aqueous phase after settling: 11.2
Volume of precipitate after settling: 200 ml
Volume $CO_2$ necessary to obtain pH 7 : 13.1
Weight of solids dissolved in aqueous phase after $CO_2$ neutralization: 0.6 g per liter. This corresponds to 0.066 g phosphorus, 0.108 g calcium and 0.017 g sulfur per liter effluent.

WORKING EXAMPLE 3

In a 500 ml reactor (see FIG. 1) held at 94° C, MTB containing 50 g of acidic material per liter is added from a flask, heated to same temperature, at a rate of 20 ml per minute. At the same time an aqueous slurry of 43 g CaO per liter is added to the reactor from an equally heated flask (94° C). Both flasks and the reactor are well stirred during the operation. One method of adding the lime slurry is illustrated in FIG. 1. Water is added to the lime slurry which is forced into the reactor by overflow.

The pH in the reactor is continuously controlled and the rate of addition of the CaO slurry is adjusted to maintain a pH of 8-11 in the reactor. The overflow of the reactor is directed to settling pond in which the finely divided, nearly white homogeneous solid precipitates. The settling pond has an overflow at the other end into a flask provided with a $CO_2$ gas inlet to neutralize the aqueous phase. A clear, nearly colorless water is obtained with this procedure.

Amount of CaO used per liter MTB: 28.8 g
Settling time: 4.5 hours
pH of aqueous phase after settling: 10.5
Volume of precipitate after settling, per liter MTB: 775 ml
Volume $CO_2$ necessary to obtain pH 7, per liter MTB: 0.4 l
Weight of solids dissolved in aqueous phase after $CO_2$ neutralization: 1.0 g per liter.

WORKING EXAMPLE 4

The procedure is the same as in Example 3 except that between the flask containing the MTB and the reactor, $Fe^{3+}$ ions are added to the MTB at a rate of 0.20 g per liter MTB in the form of an aqueous solution of $Fe(NO_3)_3 \cdot gH_2O$. The MTB contains 87.5 g acidic materials per liter.

Amount of CaO used per liter MTB: 39 g
pH of aqueous phase after settling: 10
Volume of precipitate after settling, per liter MTB: 651 ml
Volume of precipitate after settling, per liter MTB, control run: 1011 ml.

The control run is identical to Example 4 except that the addition of $Fe^{3+}$ ions is omitted. The smaller volume of precipitate when using $Fe^{3+}$ ions constitutes a higher yield of clear effluent water.

WORKING EXAMPLE 5

7.9 g of the precipitate obtained as in Example 3 (after drying at 100° C) is heated for 3 hours in a tubular over to 850°–900° C while a slow stream of air (20 ml per minute) is applied. The residue in the oven after cooling is a white powder weighing 5.6 g.

Analysis of the precipitate before calcination: C: 88.8; H: 4.8; P: 13.1; Ca: 21.6.
Analysis of the precipitate after calcination: C: 0.4; H: 0.08; P: 19.5; Ca: 36.4.

By the present process, acidic waste streams which contain toxic or inhibitory materials may be rendered amenable to biological waste treatment by the precipitation of said toxic materials as their insoluble calcium salts. The liquid from this treatment can be neutralized with $CO_2$ gas to give an effluent having a greatly reduced concentration of phosphorus, calcium and sulfur.

While the present invention has been illustrated mainly with reference to the treatment of highly acid aqueous industrial waste containing biologically toxic organophosphates, it will be appreciated by those skilled in the art that waste streams rendered highly acidic by the presence of any similarly toxic material can be effectively treated in the same manner.

What is claimed is:

1. A continuous process for purifying an acid effluent having a pH of 1.2 to 3 said effluent being an aqueous residue resulting from a methanol distillation in a process for manufacturing mono (beta-hydroxyethyl) alkene thiophosphonate and containing phosphonic acids of general formula $C_nH_{2n+1}PO_3H_2$ where $n = 12$ to 24 and phosphoric acid in a ratio of up to 75 to 25, comprising, in combination: contacting said effluent with a slurry of 55 to 93 weight percent of a reagent of the group of calcium oxide and calcium hydroxide based on the amount of said acids present in said effluent, mixing said effluent and said slurry in a reaction zone, maintaining the resulting mixture in said zone at a temperature of between about 80° and 100° C for between 1 and 30 minutes, to raise and maintain the pH of said effluent between 8 to 12 and form a precipitate and a clear aqueous phase and then continuously separating said precipitate from said phase.

2. The process of claim 1, wherein said mixture is flowed from said zone to a settling zone and caused to remain therein under quiescent flow conditions for 1 to 5 hours to precipitate finely divided solids therefrom.

3. The process of claim 2, wherein supernatant from said settling zone is flowed to a carbonation zone and neutralized with $CO_2$ gas to form a precipitate and a clear aqueous phase.

4. The process of claim 3, wherein said aqueous phase is discharged into a receiving body of water.

5. The process of claim 4, wherein said precipitate is calcined by heating to about 850° to about 900° C in a slowly moving air stream to form calcium triphosphate.

* * * * *